United States Patent [19]

Jackson

[11] 4,260,107

[45] Apr. 7, 1981

[54] HYDROSTATIC SPRAYING SYSTEM

[76] Inventor: Clarence L. Jackson, 819 Caseyville Rd., Caseyville, Ill. 62232

[21] Appl. No.: 963,783

[22] Filed: Nov. 27, 1978

[51] Int. Cl.³ .......................... B05B 9/06; B05B 1/16
[52] U.S. Cl. ...................................... 239/74; 239/124; 239/142; 239/155; 239/167; 239/170; 417/399
[58] Field of Search .......................... 417/63, 398, 399; 239/71, 74, 124, 127, 142, 155–157, 167, 170, 172, 176

[56] References Cited

U.S. PATENT DOCUMENTS

| | | | |
|---|---|---|---|
| 1,843,759 | 2/1932 | Chipman | 239/170 X |
| 3,239,148 | 3/1966 | Etnyre | 239/127 X |
| 3,330,211 | 7/1967 | Faro et al. | 417/399 X |
| 3,491,949 | 1/1970 | Hairston | 239/127 |
| 3,902,667 | 9/1975 | Jackson | 239/167 |
| 4,076,458 | 2/1978 | Jones | 417/63 X |

*Primary Examiner*—Andres Kashnikow
*Attorney, Agent, or Firm*—Kalish & Gilster

[57] ABSTRACT

A hydrostatic spraying system with multiple spray booms for use with vehicles is especially suited for spraying agricultural treatment liquids such as fertilizers, herbicides, insecticides, trace minerals, etc. The system includes an operator-controllable variable displacement hydraulic pump driven by the vehicle, e.g., via its transfer case. A linear hydraulic motor is powered by the pump, being operated at a speed dependent upon a preselected output of the variable displacement pump and the rate of ground travel. Solenoid-controlled valving alternately supplies the hydraulic fluid to opposite ends of the linear motor for oscillating stroking operation of the motor. Twin linear hydraulic pumps interconnected with the linear motor each draw treatment liquid from a liquid supply tank and deliver treatment liquid under pressure in a precisely metered amount upon each stroke of the linear motor through corresponding operator-controlled diverter valves which are selectively operable to permit the metered amounts of treatment liquid to flow to respective spray booms or to be returned to the supply tank in a sparging line connection. The metered amounts delivered by each linear pump for delivery by the spray booms may be determined and totalled accurately by counters.

31 Claims, 9 Drawing Figures

HYDROSTATIC SPRAYING SYSTEM

BACKGROUND AND SUMMARY OF THE INVENTION

This invention relates to spraying for use with vehicles as primarily for agricultural purposes.

A problem of extreme criticality in the application of fertilizers, herbicides, insecticides and other treatment liquids, including suspensions of various crop treatment elements, or organic or inorganic compounds, for agricultural purposes is that such liquids should be very precisely applied. If applied in less than a preselected appropriate concentration, they may be partially or even totally ineffectual for herbicidal or insecticidal properties, whereas if applied in greater than a proper concentration, such liquids may cause extremely adverse conditions, e.g., crop destruction or so-called carryover from one season to the next, a condition which may have quite severe manifestations if a crop planted in the next season is different from that on the treated acreage but has increased sensitivity to the liquid.

A further problem of applying agricultural chemicals is that, due to toxic, mutagenic or carcinogenic tendencies or characteristics, predetermined concentrations may not be exceeded. Often, federal agencies establish lawful maximum concentrations for soil or crop treatment chemicals.

Myriad factors, therefore, make it extremely desirable to apply agricultural liquids very precisely and accurately.

Prior to the apparatus disclosed in Jackson U.S. Pat. No. 3,902,667, issued Sept. 2, 1975, and entitled "Spraying System," agricultural spray apparatus of the prior art has not provided the requisite precision and accuracy.

But another factor of importance in applying agricultural treatment liquids by spraying is manifested by the need to be able to vary the rate of spraying not only in accordance with the type of liquid, its concentration, the type of crops or conditions, and the nature of mixtures, compounds or suspensions of various sprayable liquids, but also in accordance with the speed of applications, noting that a vehicle utilized for spraying may travel at various speeds dependent upon field or crop conditions, etc.

To control spray rates, an arrangement is disclosed in said Jackson U.S. Pat. No. 3,902,667 to vary the length of the stroke of piston pumps which supply liquid under pressure to each of a pair of spray booms. But a mechanical adjustment for each spray pump is necessary.

Among the objects of the invention may be noted the provision of a vehicle borne spraying system which not only applies agricultural liquids precisely and accurately but also at a correctly and easily preselected rate which is conveniently controlled.

It is another object of the invention to provide a spraying system of the character stated which incorporates plural spray booms and which provides selective control over the application of agricultural liquids by any of said booms while precisely and accurately applying said liquid by any one of said booms.

It is another object of the invention to provide a spraying system of the character stated which applies metered amounts of agriculturals as a preselected function of the rate of travel of a vehicle carrying said system.

It is a further object of the invention to provide a spraying system of the character stated which can measure and indicate the precise amount of agricultural fluid delivered by respective spray booms of the system.

It is still a further object of the invention to provide a spraying system of the character stated having fluid handling components which achieves flow of agricultural liquid through said components with a minimum velocity and quantity to achieve efficiency and long life of such components.

It is another object of the present invention to provide a spraying system of the character stated which is adapted for integration upon existing vehicles and, therefore, obviates the need for the costly production of specialized vehicles.

It is a still further object of the present invention to provide a spraying system which includes remote controlled fluid-actuated adjustable positioning of the boom, both horizontally and vertically.

It is another object of the present invention to provide a spraying system of the character stated which may be controlled from the cab of the vehicle so that operation of both the vehicle and the spraying system may be under the control of a single individual.

It is a further object of the present invention to provide a spraying system of the character stated which is economical in construction; which is extremely durable and reliable in operation, being designed for stability and resistance to breakdown; and the operation of which assures of effective material discharge for the areas being treated.

BRIEF DESCRIPTION OF THE DRAWINGS

Corresponding reference characters indicate corresponding parts throughout the several different views of the drawings.

DESCRIPTION OF THE PREFERRED EMBODIMENT

Figure 1:
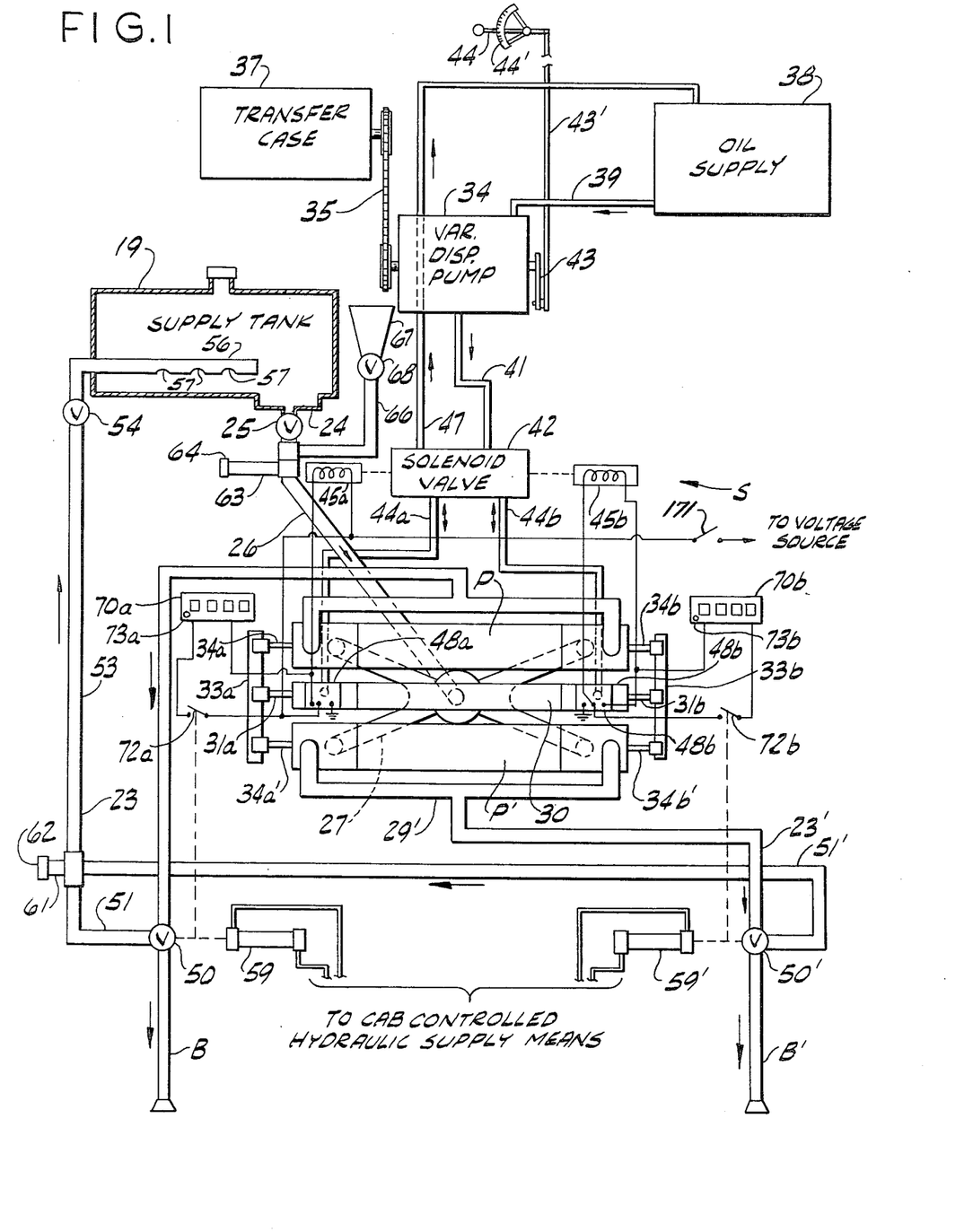
FIG. 1 is a schematic, partly pictorial diagram of a spraying system constructed in accordance with and embodying the present invention.
Figure 2:
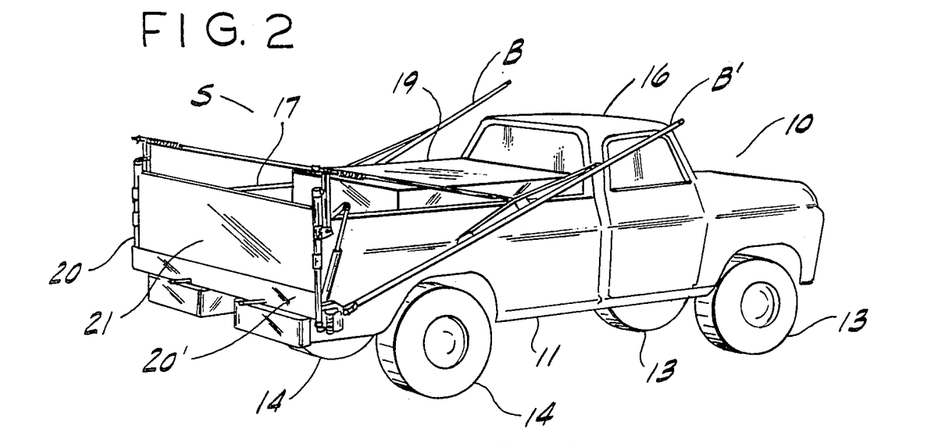
FIG. 2 is a rear perspective view of a truck equipped with the spraying system of FIG. 1.

Referring now by reference characters to the drawings which illustrate the preferred embodiment of the present invention, and particularly FIGS. 1 and 2, designated generally at 10 is a vehicle, preferably a truck of the four-wheel drive type of pick-up or larger size, having a body 11 supported by pairs of front and rear wheels 13,14 and having a cab 16 behind which is located a cargo carrying area 17 having the usual bed (not shown) upon which elements of a spraying system of the invention, including a tank 19 are carried.

The new spraying system, which is designated S, comprises a pair of boom assemblies B,B' including an arrangement as disclosed in the above noted U.S. Pat. No. 3,902,667 of Clarence L. Jackson, entitled "Spraying System," which provides pivoting attachments of the booms to truck body 11 and includes hydraulic actuated means for adjustable positioning of the booms on both vertically and horizontally for spraying from the booms B,B' of liquid contained within tank 19 for agricultural purposes. Thus, tank 19 constitutes a reservoir of a particular liquid, which is dispensed by spraying system S, for being sprayed by either or both of booms B,B'. The particular liquids which may be dispensed may include fertilizing solutions and the like as used for agricultural purposes.

The booms are pivotally secured to truck body 11 by means of substantially identical mechanisms 20,20' secured to truck body 11 to opposite sides of a tailgate 21 which is hinged in order to permit a ready access to the cargo area 17 of the truck and components of said spraying system S which are contained therein.

Although specific mechanical features of spraying system S are described hereinbelow with reference to FIGS. 3-7, attention is directed to FIG. 1 for the purpose of providing an understanding of the basic features and their operation as embodied in the spraying system S. Accordingly, with reference to FIG. 1, the spraying system is shown interconnected with supply tank 19, from which the system will dispense a liquid contained therein by means of either or both of spray booms B,B'. The spraying system comprises an interconnected pair of linear hydraulic pumps P,P', each adapted to provide a liquid from supply tank 19 under pressure through one of a pair of conduits 23,23', respectively. For this purpose, liquid from the sump 24 of tank 19 is delivered through a valve 25 and a fluid conduit 26 to a manifold 27 which is positioned beneath pumps P,P' for the purpose of feeding each of the pumps commonly from said conduit 26. As will be apparent, manifold 27 commonly provides fluid from supply tank 19 to opposite ends of each pump P,P' whereby liquid will be drawn into the pumps on each stroke. Also interconnected with each end of pumps P,P' are respective discharge manifolds 29,29' with which fluid conduits 23,23' are respectively interconnected.

Pumps P,P' are each adapted to be operated by a single linear hydraulic motor 30 centered between the pumps. Hydraulic motor 30 has actuator rods 31a,31b extending from opposite ends thereof each interconnected in conventional fashion with a piston within the motor which is adapted to be driven back and forth within the motor housing. Linked to actuator rods 31a,31b by means of link bars 33a,31b at opposite sides of the pumping arrangement are corresponding actuator rods 34a,34b and 34a',34b' which extend from opposite sides of the respective pumps P,P'.

Accordingly, it is seen that the actuators of each of the pumps are each reciprocally driven in and out by the actuator rods 31a,31b of hydraulic motor 30. It is to be understood that bars 33a,33b move in unison so that movement of bar 33a to the left, for example, causes movement of bar 33b to the left, and so forth with the result that the actuating rods of the pumps P,P' are caused to exhibit reciprocating movement in response to operation of hydraulic motor 30.

Hydraulic fluid under pressure for operation of hydraulic motor 30 is provided by means of a variable displacement hydraulic pump 34 drive, as by means of a sprocket and chain drive 35, from the power take-off of the vehicle's transmission transfer case 37 which latter is of conventional configuration. The details of said drive arrangement are not disclosed herein, but will be understood by reference to above identified Jackson U.S. Pat. No. 3,902,667. At 38 is shown a tank for containing a supply of hydraulic oil to be provided by means of a fluid conduit 39 to pump 34, the output of which may be varied in volumetric flow, at its operating pressure, in response to positioning of an arm 43 by a lever 44 relative to a quadrant 44' which is preferably marked with indicia calibrated in terms of a desired treatment, i.e., spray rate such as in gallons or hundreds of pounds per acre. This arm is interconnected with cab controls by means of a link 43' whereby the operator of vehicle 10 may control the rate of displacement of pump 34 from cab 16. As will be understood, the interconnection of pump 34 with transfer case 37 causes the operation of the pump to correspond to the rate of ground travel of truck 10, the flow thereby being at a rate corresponding to the speed of the truck.

Solenoid valve 42 has interconnected with it a pair of hydraulic lines 44a,44b which extend to opposite sides of hydraulic motor 30. Solenoid valve 42 is operated by a pair of solenoids 45a,45b which are alternately energized to cause lines 44a,44b to be alternately connected to hydraulic line 41 whereby the hydraulic pressure provided by variable displacement pump 34 is alternately provided to opposite sides of hydraulic motor 30. Also interconnected with solenoid valve 42 is a hydraulic fluid return line 47 extending from solenoid 42 to the hydraulic oil supply tank 38, and this return line is also alternately connected with hydraulic lines 44a,44b by solenoid valve 42.

More specifically, the arrangement is such that when line 41 is connected to one of lines 44a,44b, the other of said lines is connected to return line 47. Thus, hydraulic fluid under pressure is provided to one side of hydraulic motor 30 while a return connection is made to the opposite side of the motor, permitting fluid to flow into motor 30 from one side while fluid is returned to the oil supply tank 38 from the opposite side. The pressure and return interconnections between the opposite ends of hydraulic motor 30 and solenoid valve 42 are alternated upon operation of solenoid valve 42 in response to alternate energization of solenoids 45a,45b.

For this purpose, hydraulic motor 30 is provided with a pair of proximity sensing devices 48a,48b of commercially available type positioned at opposite ends of hydraulic motor 30. Said proximity sensing devices are each interconnected with a voltage source by means of a circuit lead and also with each of solenoid valve 45a,45b. The proximity sensors are each adapted to sense the position of the hydraulic piston or the actuator structure within hydraulic motor 30 as the same is moved back and forth in oscillating fashion within the motor housing in response to hydraulic pressure. Therefore, it is to be understood that each such proximity sensor switch device 48a,48b is operative to provide energization of the respective solenoid 45a,45b for alternately positioning the valving element within solenoid 42 to provide the alternate connection of the hydraulic pressure and line 41 and return line 47 to the motor 30 in the manner described above. Proximity sensors 48a,48b may be of a solid state type responsive to the end-of-limit presence of the motor piston (as at 32) at the respective end of the motor cylinder or may be switches mechanically actuated by the pump piston, pump actuator rods 31a,31b or the link bars 33a,33b, etc., to give the same switching function.

Operation of linear motor 30 in the manner described above is, accordingly, seen to cause actuation of each of said pumps P,P' for the purpose of delivering fertilizer, herbicide, insecticide, trace element suspension or any of various other treatment liquids from supply tank 19 via fluid conduits 23,23' with such liquid being delivered upon each stroke (i.e., direction of movement) of the twin pumps, P,P' so that it is to be understood that these pumps are each of a double acting configuration.

Connected in each of said conduits is a respective valve 50,50' which are adapted to permit flow of the treatment liquid from conduits 23,23' to the respective booms B,B' or else to divert such flow through conduits 51,51' also interconnected with the valves. Accordingly, valves 50,50' each may be referred to hereinbelow as diverter valves. Conduits 51,51' are each adapted to return fluid pumped through the respective conduits 23,23' to the liquid supply tank 19 through a common return conduit 53 which is referred to herein as a sparge line.

Included in said sparge line is a valve 54 for purposes to be explained. Said sparge line 53 is extended into a supply tank 19 as a portion 56 extending along the floor of the tank and having a plurality of apertures 57 therein adapted to permit flow of liquid from sparge line 53 through the contents of the supply tank for the purposes of agitation and mixing of the contents of the tank, all as more fully developed hereinbelow.

From the foregoing, it is manifest that liquid pumped by either of pumps P,P' through conduits 23,23' will, upon positioning of the diverter valves 50,50' to the position ceasing to supply such liquid to the respective spray booms B,B', be returned via sparge line 53 to supply tank 19 for mixing and agitation of the contents of the tank. Operation of diverter valves 50,50' is controlled by respective hydraulic actuation cylinders 59,59' from a source (not shown) of hydraulic pressure which is different from that provided by variable displacement pump 34, but which may be provided substantially in accordance with the teachings of said Jackson U.S. Pat. No. 3,902,667, being preferably a hydraulic pump driven either by means of a power take-off from transfer case 37 or by a small electric motor. Each of the diverter valve actuator cylinders 59,59' or hydraulic control means therefor is interconnected with controls in the cab 16 of the truck for permitting the operator of the vehicle to selectively operate either or both of the diverter valves in accordance with the need to initiate or terminate the flow of treatment fluid through each of booms B,B'.

A short length of fluid conduit 61 having a cap 62 thereon is made by means of a tee fitting in sparge line 53 for permitting the interconnection of a hose or the like to sparge line 53 for pumping the contents of supply tank 19 out through conduit 61 for off-loading of the vehicle supply tank. For such off-loading, valve 54 is closed. Optionally, the system is provided with a conduit 63 having a cap 64 thereon for communicating with fluid conduit 26 below valve 25 to permit interconnection of the hose or the like for supplying liquid to the system for filling of the supply tank or permitting direct introduction of fluid to be pumped by pumps P,P' to the booms B,B' from a different source of liquid other than supply tank 19. In the latter event, valve 25 is closed.

A further feature may be noted the provision of a fluid conduit 66 having connected to it a hopper-like fixture 67 which is referred to hereinbelow as an eductor. A valve 68 is provided between the eductor 67 and conduits 66. Normally said valve 68 is closed but may be selectively open during pumping to permit the introduction into eductor 67 of various powders, liquids, or chemicals in general, such as trace elements or minerals, as well as additives and the like, to be introduced into the liquid which is being pumped from supply tank 19.

Because of the hitherto unobtainable capability of the present spraying system to provide precisely needed amounts of agricultural treatment liquid to spray booms B,B', the system is advantageously utilizable to determine and accurately total the amount of treatment liquid sprayed by either or both of the booms. For this purpose, the system may be provided, as indicated at 70*a*,70*b*, with digital counters of the electrically energizable type which may be interconnected, as shown, with proximity sensors 48*a*,48*b* for supplying voltage for incrementing the respective counters as the piston of linear motor 30 reaches the end of its stroke, thereby indicating that each of the respective pumps P,P' has delivered the full amount of treatment liquid contained within the cylinder thereof to the respective conduit 23,23'.

In order to cause counters 70*a*,70*b* to indicate only the total amount actually delivered by the spray booms, interconnected with each counter is a respective switch 72*a*,72*b* which is shown mechanically interconnected with diverter valves 50,50' whereby the circuit for energizing the respective counter can be completed only when the corresponding diverter valve 50,50' is in a posibion for delivering treatment fluid to the respective booms B,B'. Hence, the counters will be operative to count and indicate when treatment liquid is being sprayed by a respective spray boom and will indicate the total of the number of strokes of metered amounts of such treatment liquid delivered by each pump. Desirably, counters 70*a*,70*b* are of the type having means such as a button indicated at 73*a*,73*b* for resetting the counter, e.g., after application of treatment liquid to a specific area. Counters 70*a*,70*b* may be used either to count the number of stroking cycles of actual strokes.

As will be understood, the total count indicated starting from zero count upon commencement of spraying and showing a total count upon completion of spraying will be accurately proportionally representative of the total gallonage delivered to a specific area which has undergone spraying so that for the first time a spraying system of the general character disclosed is capable of measuring, indicating and totalling in a precise and especially accurate manner the amount applied to a given area without need to resort to calibration, use of flow meters, or various other complicated and expensive measuring or indicating devices typical of the prior art compared to which the new spraying system is a pumping arrangement which achieves the function of requisite liquid delivery while at the same precisely metering of the amounts of liquid delivered.

With the general features of the new spraying system being thus understood, attention is directed to FIGS. 2-6 illustrating the specifically preferred constructions of the components of the new spraying system.

Referring in particular to FIGS. 3 and 4, the rear elevation (FIG. 3) of the spraying system reveals the general character and layout of the boom securement to vehicle 10, such elevation being taken with the tailgate or rear closure 21 of the truck removal to illustrate that the vehicle is provided with a rear frame member 74 extending substantially the width of the vehicle for the mounting of the boom assemblies in pivotal manner suggested by FIG. 2.

Since each of the boom assemblies B,B' are of like construction, only assembly B disposed on the lefthand side of the vehicle 10, as viewed in FIGS. 2 and 3, will be described for brevity. The general features and specific manner of pivotal securement of the boom assemblies B,B' to transferse member 74 is identical to that of the spraying system disclosed in the now abandoned application Ser. No. 776,948 of Clarence L. Jackson, filed Mar. 14, 1977, herein incorporated by reference of which application Ser. No. 950,789, now U.S. Pat. No. 4,213,565 is a continuation.

Therefore, the specific features and mechanical elements of the boom securement and means for actuating and positioning the booms hydraulically are neither shown nor described herein in specific detail, but generally may be noted as including a pivot assembly 75 to which the lower end 76 of the boom is secured by means of a clevis arrangement 77 from which extends an arm 78 fixed swivelly to the underside of a horizontally disposed mounting plate 80 by means of a vertically extending retainer 81. The latter carries a compression spring 82 urging a lower portion of arm 78 into abutting relationship with plate 80 with such plate being carried in horizontal pivotal relationship outwardly from transverse frame member 74. The frame member 74 is mounted in suitable fashion to the chassis of the vehicle so that the weight of the respective boom is borne thereby. The spring loaded retainer 81 permits parting between plate 80 and the retainer in the event that the associated boom assembly sustains any untoward force or impact as occasioned, for example, by obstacles within the path of travel of vehicle 10 or any ground unevenness.

The boom pivot assembly includes also a hydraulic cylinder 84' interconnected with plate 80 for controlling horizontal swinging of the boom assembly, and such cylinder is, in accordance with the specific apparatus disclosed and described in said application Ser. No. 776,948, adapted to allow the operator to remotely effect positioning of the spray boom relative horizontally to the vehicle.

Additionally, a further hydraulic cylinder 84 is pivotally secured at its lower end, as indicated at 85 to an extension of frame member 74 and includes an actuator rod 86 connected at the cylinder remote end 87 to an outwardly canted arm 88 of a swivel yoke 89. Said yoke is carried by an upper transverse member 91 extending the width of the vehicle above and parallel to transverse member 74. Swivel yoke 89 has secured at its upper end in pivotal relationship thereto a lift rod 92 which extends outward and engages the boom in pivotal relationship intermediate the extremities of the boom for lifting of the boom in response to the extension of actuator 86 from hydraulic cylinder 84. Cylinders 84,84' preferably are powered by hydraulic fluid supplied by a source (such as that used for diverter valve actuation cylinders 59,59') separate from variable displacement pump 34.

Swivel yoke 89 is secured at its lower end at 93 to a fitting 94 which extends around a tubular column 96 constituted by a length of conduit which is closed at its upper end 97 for the purpose of providing a surge or pulsation elimination column or chamber 96 which extends upward from a tee fitting 97 with which it communicates. A length of conduit 99 extends downwardly therefrom so that the length of conduit 97 and column 96 also provide vertical spacing between transverse members 74 and 91. Extending from the lower end of column 99 by means of a swivel fitting 100 is a length of flexible conduit 101 which carries treatment fluid out to the boom, all as described in the above-identified application Ser. No. 776,948, wherein precise interrelationship of parts for present purposes is adquately shown and described so that further description thereof is not necessary.

Figure 3:
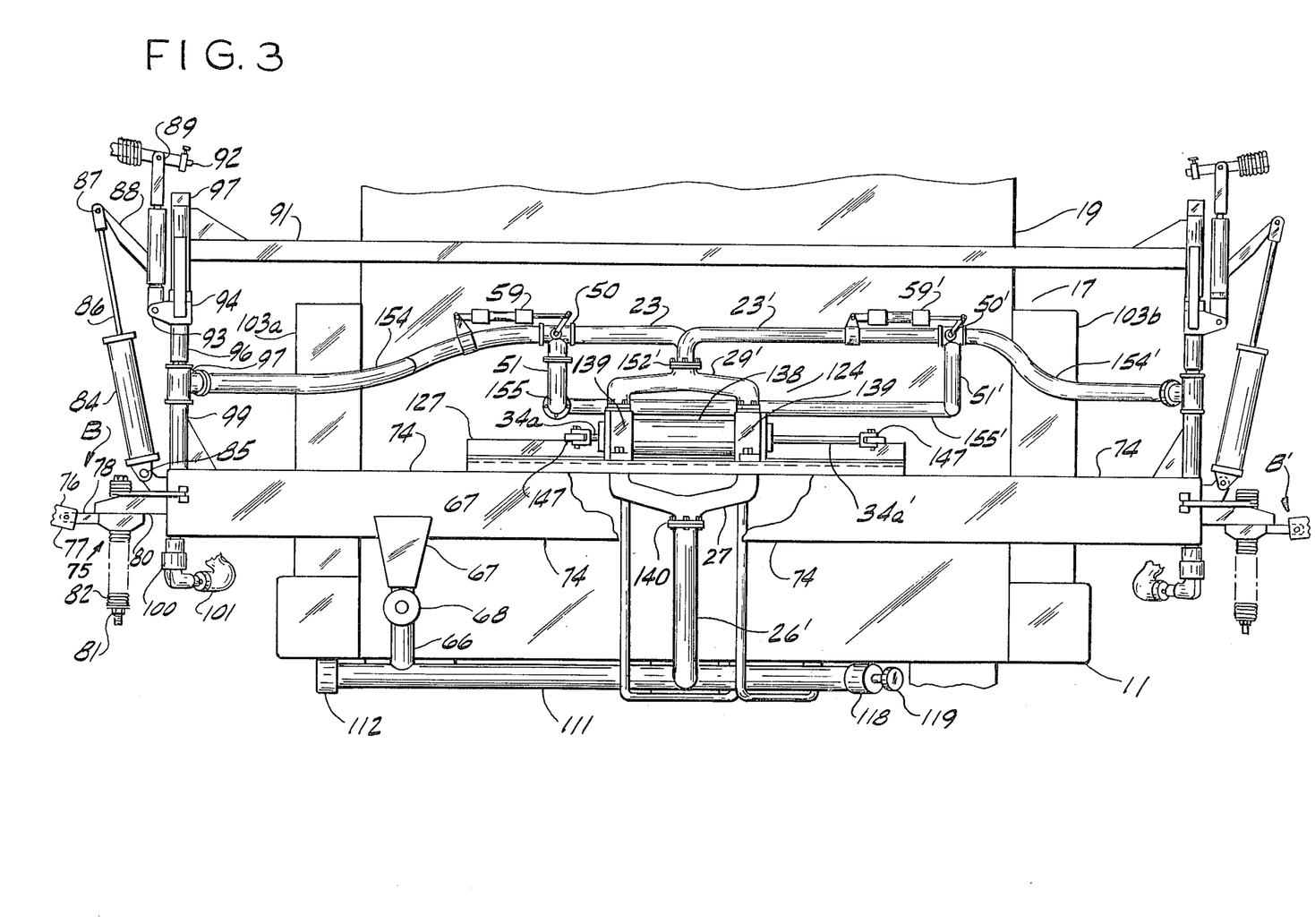
FIG. 3 is a rear elevational view of the spraying system, with certain boom components thereof broken away, illustrating salient portions of the spraying system as mounted on the truck.
Figures 5, 7:
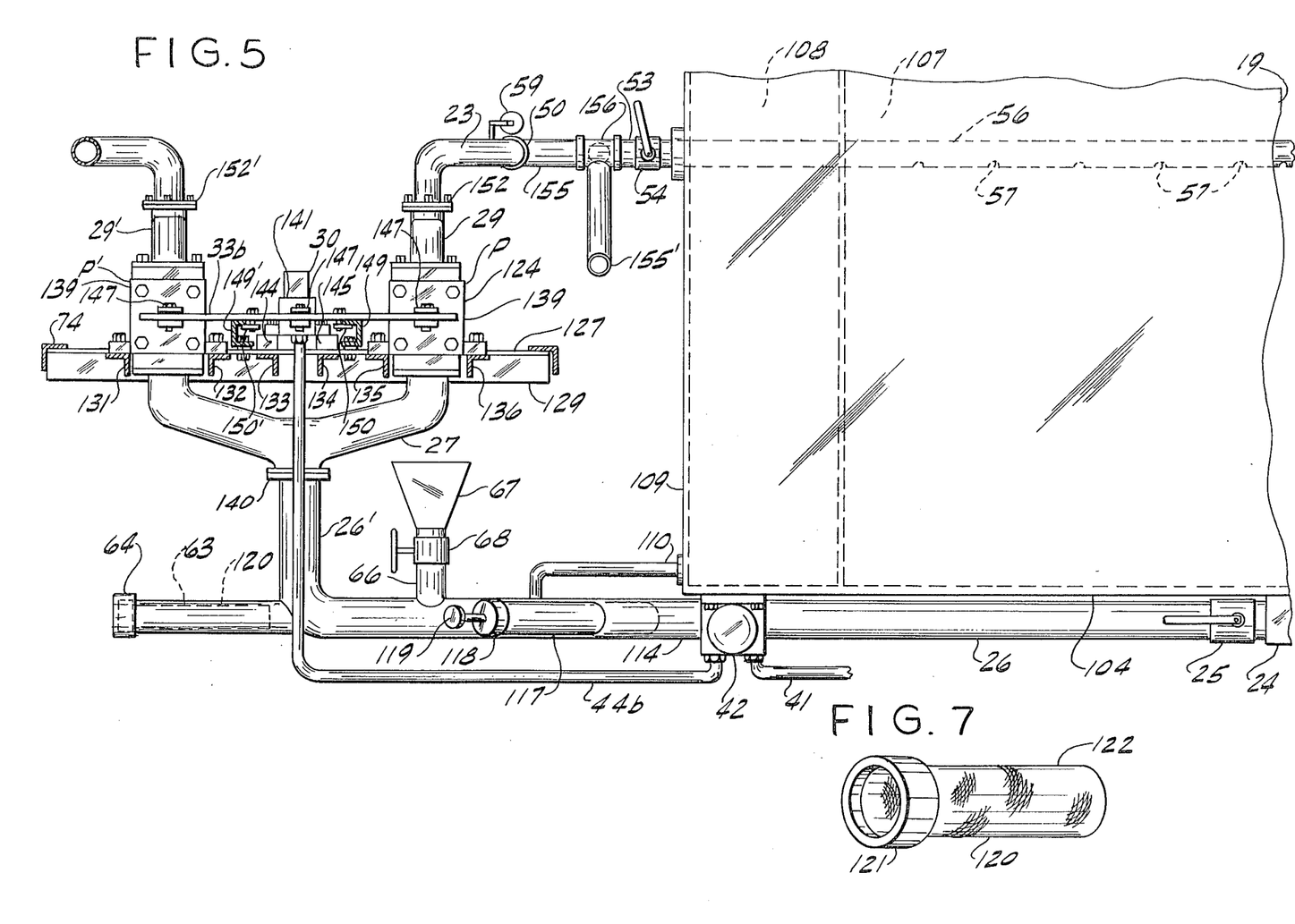
FIG. 5 is a side elevational view, partly in cross-section, as taken along line 5—5 of FIG. 4.
FIG. 7 is a perspective view of a screen-type filter employed in the system.
Figure 6:
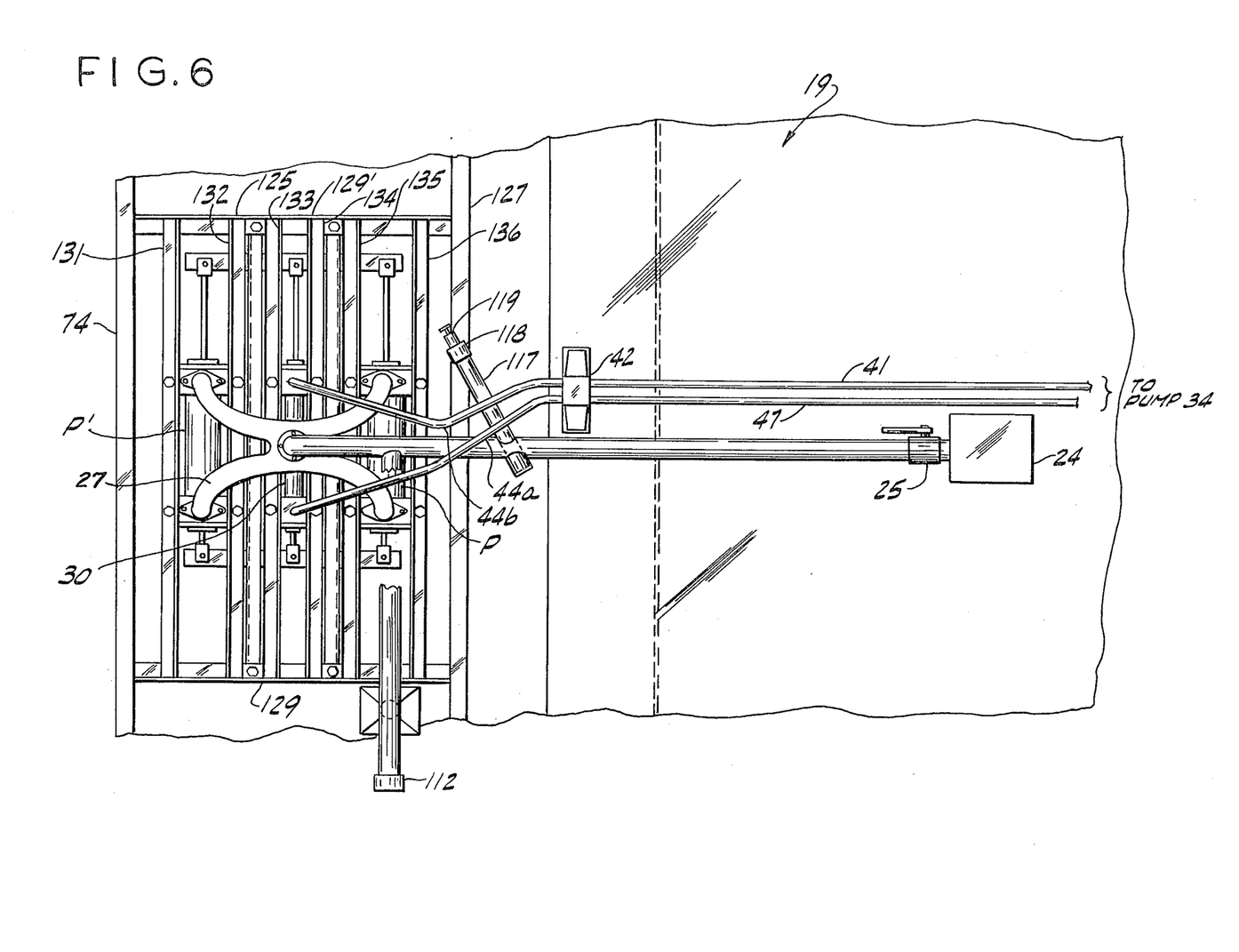
FIG. 6 is a bottom elevation of certain portions of the spraying system, as viewed from beneath the system from the level of the truck of the bed.

Referring still to FIG. 3, the body 11 of the vehicle is shown to have opposite sides 103a, 103b which define the width of cargo carrying area 17. Within such area, tank 19 is positioned and may be noted as having substantially the same width as the space available between side members 103a, 103b and being of rectangular configuration. Referring also to FIGS. 5 and 6, the bottom 104 of the tank is seen to be provided with sump 24 which is similarly of a generally rectangular character. Secured to and communicating with sump 24 is conduit 26 which is constituted by a horizontal length of relatively large gauge tubing. The tubing extends generally parallel to the floor 104 of the tank then turns upwardly into an upstanding portion 26' to which a manifold of the linear motor-and-pump assembly is connected. Valve 25 is provided as a main shut-off to prevent discharge of the contents from tank 19 and is seen to be located proximally to sump 24, but may be more rearwardly located, and may be a quarter-turn ball-type valve whereby it may be open and closed upon movement through 90 degrees of rotation.

The character of tank 19 is more specifically seen to be compartmentalized with the tank having a principal compartment 107 and a smaller compartment 108 rearwardly thereof with the rear compartment having connected to its rear face 109 a length of smaller diameter conduit 110 communicating with the large diameter main feed conduit 26. This arrangement provides for storage of water for flush-out purposes primarily but can also provide the capability of mixing of different liquids so that, for example, a fertilizing compound may be stored in compartment 107 with an herbicide being provided in compartment 108. Optionally, a shut-off or proportioning valve 113 may be utilized, if desired, for controlling the amount of fluid flowing from compartment 108 through conduit 110 and joining that which flows through main tank supply conduit 26.

Rearwardly of the union of conduit 110 with conduit 26, the so-called eductor 67 is connected to an extension 111 extending laterally from conduit 26 joined to the latter by a tee connection, there being a cap 112 which closes conduit 111 but is removable for draining or flushing of tank 19. Valve 68 is seen to permit the eductor to communicate with conduit 26 when open. The eductor is preferably of a hopper size with a capacity of two to three gallons whereby various chemicals or compounds to be introduced into the supply conduit 26 in relatively small or trace percentages may be permitted to be drawn into the pump manifold 27 when valve 68 is open.

Shown interconnected with main conduit 26 is a relatively short length of somewhat smaller diameter tubing which appears to extend horizontally through conduit 26 at an angle thereto, but actually comprises a first length 114 of conduit in alignment with a shorter length 115 and together constituting a strainer designated in its entirety 117 and containing a screen-type filter of the general configuration shown in FIG. 7 retained in place by a cap 118 threaded onto the distal end of tubing 114. This arrangement is such that liquid supplied through conduit 26 from the tank may flow entirely through the filter and only then is permitted to continue through the conduit for delivery by upstanding section 26' thereof. Cap 118 is provided with a valve 119 which is normally closed but may be open for cleaning out the filter.

Referring to FIG. 7, the filter is designated 120 and includes a securement collar at one end and a foraminous or screen-like cylinder 122 extending from collar 121 and being closed at its collar-remote end. Strainer 117 is located so that fluid flowing through conduit 110 bypasses the strainer and is thereby not filtered but the arrangement permits a suspension of granular products or compound, etc. in tank compartment 108 which are thus permitted to flow unencumbered to the pump manifold 27 without blockage of filter 120.

Referring to FIG. 5, the optional conduit extension 63 having a cap 64 thereon which is removable for permitting interconnection of the hose or the like for supplying liquid to the system for filling of the supply tank or permitting direct introduction of fluid to be pumped via manifold 27 is shown to be interconnected at the lower end of upstanding portion 26' of the main supply conduit being thus seen to be presented most conveniently for optional so-called "load-in" purposes. The interior of extension 63 preferably is fitted with a filter 120 of the configuration disclosed in FIG. 7 so that liquids introduced via conduits 63 are filtered before being pumped or entering tank 19, as the case may be.

Figure 4:
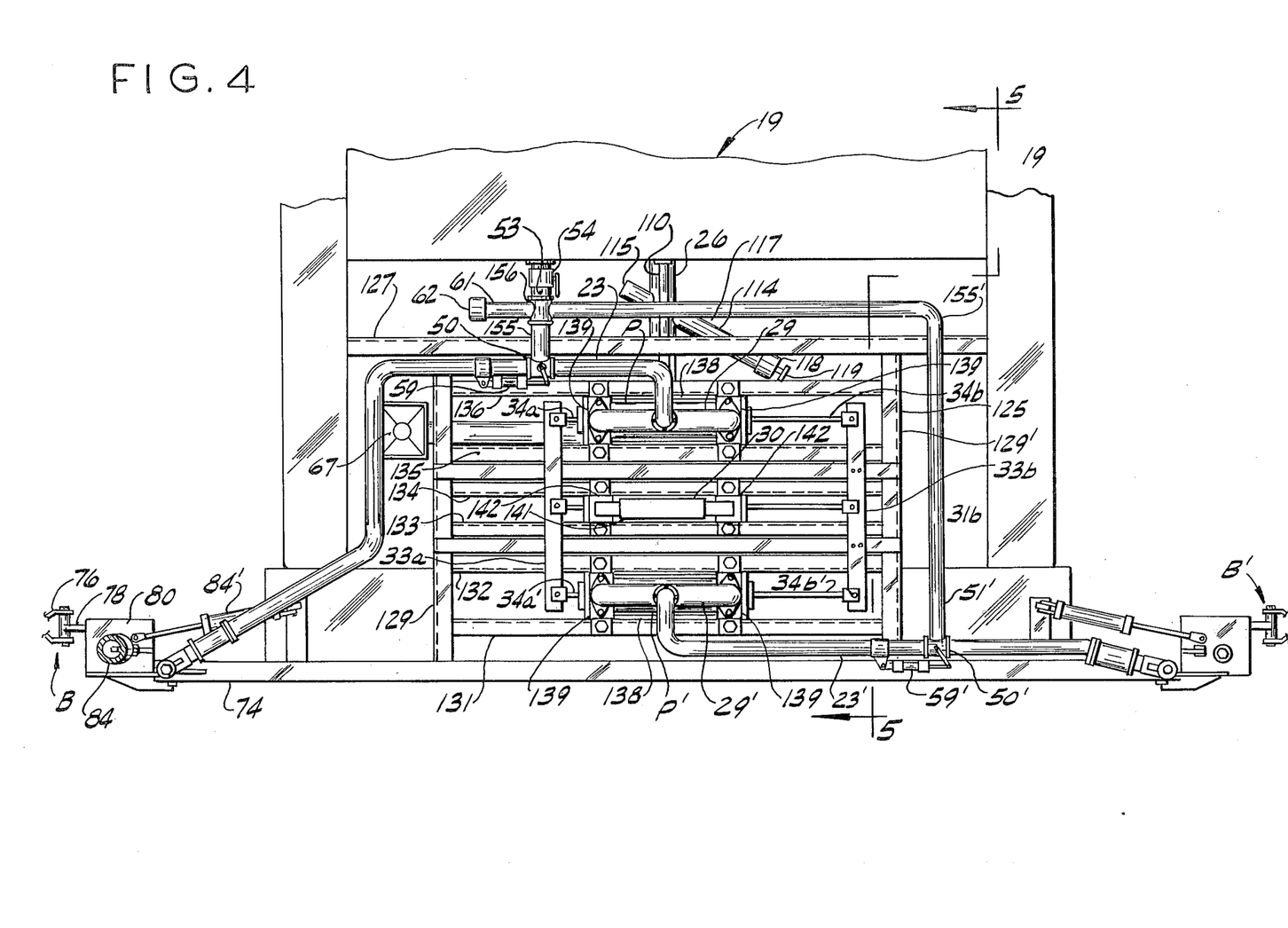
FIG. 4 is a top plan view of principal portions of the new spraying system as mounted on the truck.

Pumps P,P' and linear motor 30 are interconnected at a unit 124 supported by a frame assembly 125 which is carried between lateral frame member 74 and a further member 127 extending transversely across the bed or cargo area 17 of the vehicle (see particularly FIGS. 4 and 6). Said frame assembly 125 includes a pair of longitudinally extending support members 129,129' of L-section bracket configuration which are carried between transverse members 124,127. Carried between members 129,129' and extending transversely with respect to the longitudinal axis of the vehicle are a plurality of similarly L-section transverse members 131,136, each of which is secured at its opposite ends as by welding to the longitudinal members 129,129'. Said members 131,136 are spaced with respect to one another to permit the bolting thereto of pumps P,P' and motor 30.

Each of pumps P,P' has a cylindrical housing 138 typically having a four inch bore, although smaller or larger sizes may be utilized, and with the stroke of the pistons within each of the pumps being a matter of choice dependent upon the precisely predetermined amount of liquid to be pumped upon each stroke of the pump. Each pump has an end enclosure or housing 139 of rectangular configuration having ears or flanges for bolting of the pump, as shown in FIG. 5, to the respective transverse members 131,132 and 135,136, so that the two pumps are rigidly secured to frame unit 127 in parallel, spaced orientation. The end enclosures 139 are each provided with input and output ports which have valves associated with them to provide requisite dual-acting operation so that liquid may be drawn in through an input port but may not be pumped out through it, and the converse being true of each output port.

Interconnected with the input ports of each cylinder housing 139 is input manifold 27 coupled by a flange to upright portion 26' of the treatment liquid supply conduit. Thus, the treatment liquid is made available to each of the pumps P,P' and, since each said pump is of a double-acting type, fluid is ultimately drawn into alternate ends of the pump cylinder upon reversal of the direction of stroke of the pump piston within the respective cylinder 138 while being pumped out of the opposite ends. Manifold 27 is thus seen to interconnect the fluid supply conduit extension 26' with both ends of each pump P,P'.

Positioned between pumps P,P' and in parallel relationship therewith is linear hydraulic motor 30 which, as viewed in FIG. 4, is seen to comprise a cylindrical center portion or housing 141 and rectangular end housings or enclosures 142 each having a hydraulic fluid port communicating with the interior of the cylinder. The end enclosures 142 each are bolted to transverse frame members 133,134 by means of spacer blocks 144,145 (see FIG. 5) so that the cylinder housing 141 is vertically aligned with the cylinder housings 138 of each of pumps P,P' with all actuators being coplanar. The stroke length of motor 30 is the same as of that of each pump P,P'. The motor housing 141 is of reduced diameter and may have, for example, a bore of approximately two and one-half inches. A greater or lesser bore may be substituted, of course.

The ends of the actuator rods 31a,31b of the motor 30 are interconnected, as previously explained, with the actuator rods 34a,34a' and 34b,34b of the pumps P,P' by means of link bars 33a,33b at opposite sides of the assembly. The ends of the actuator rods are interconnected with links 33a,33b by a clevis and pin or bolt arrangement such as illustrated at 147 in FIG. 5, there being an identical clevis securement of each actuator rod with link bars 33a,33b maintaining the angular relationship of link bars 33a,33b with respect to the pump and motor actuator rods. A guide assembly is employed which includes a pair of faced channel-shaped bars or rails 149,149' opening toward each other and spaced on opposite sides of motor housing 141 in parallel relationship thereto. These rails each have a lower flange bolted at the opposite sides of the rails to the longitudinally extending frame members 129,129'. Link bars 33a,33b are adapted to ride on the upper flange of each of the rails and are maintained in transverse relationship to the rails by means of guides 150,150' bolted to each of link bars 33a,33b and extending marginally beneath the upper flange of each rail so as to maintain the parallel relationship of link bars 33a,33b to prevent any substantial lateral stress from being applied to the actuator rods of either of pumps P,P' or motor 30. Therefore, it should be apparent that the actuator rods move in unison throughout the full length of the pump and motor strokes and yet without imposing any undue lateral stress upon the pump and motor actuating rods.

Hydraulic fluid for operation of motor 30 is provided to the ports of end housings 142 by the interconnection to the lower sides thereof of the respective conduits 44a,44b previously identified of relatively small diameter such as three-quarter inch tubing extending between the respective housings 147 and solenoid valve 42. The latter is seen in FIG. 5 to be secured to the lower surface of tank 19, from which location the fluid supply conduit 41 and return conduit extend forwardly of the vehicle toward variable displacement pump 34, which may preferably be a piston type pump such as type PVA 120

(Series PTR3-R13-20) commercially available from the Vickers Division of Sperry Rand Corporation, Troy, Michigan 48084, having lever (or handwheel) control and a 5 gpm or more maximum displacement, such control providing a selectively variable rate of output of hydraulic fluid which is a directly proportional function, i.e., is a ratio of the ground travel speed of the vehicle.

Variable displacement pump 34 is suitably mounted in position relative to the transfer case (as represented in FIG. 1) of the vehicle. It is, therefore, apparent that it may be located in a convenient position quite remote from solenoid valve 42 or hydraulic linear motor 30, thereby obviating the relatively cumbersome mechanical linkages of the prior art which must interconnect the transfer case with the treatment liquid pump or pumps by various chain-and-sprocket, shaft or gear drives.

Extending upwardly from each end housing 141 of linear motor 30 is the respective proximity sensor or other end-of-limit switch means 48a, 48b for detecting the end of stroke of the pump to cause energization of solenoid valve 42 in a manner to alternately supply hydraulic fluid to one end of hydraulic motor 30 and then the other end for causing the motor actuator to oscillate back and forth for operation of pumps P,P'.

Discharge manifolds 29,29' for receiving treatment fluid pumped by each of pumps P,P' are interconnected with output ports of the respective end housings 139 of each of the pumps as by boling to flanges thereof, and each such discharge manifold 29,29' has a discharge opening to which the previously identified conduits 23,23', respectively, are interconnected by means of bolted flanges, as indicated at 152,152'. Each fluid conduit 23,23' which is interconnected with the discharge manifolds is relatively large diameter tubing, such as one and one-half inch diameter. Such conduits are interconnected with diverter valves 50,50' as suggested in FIG. 1. The length of conduit 23,23' as well as the diverter valves 50,50' all lie above pump assembly 124 in a substantially planar arrangement. Interconnected with each of diverter valves 50,50' are conduits 154,154' of similar large diameter tubing. The length of such tubing 154 from diverter valve 50 interconnects the latter with tee sitting 97 of the boom supply arrangement previously described. Conduit 154' similarly interconnects at diverter valve 50' with a similar boom supply arrangement for boom B'.

The previously mentioned return line 51,51' each are constituted by lengths of such large diameter tubing which extend downwardly from the respective diverter valves 50,50' and then extend as substantially coplanar horizontal lengths of tubing 155,155' where they interconnect at a fitting or union 156 of four-way configuration. Extending from one side of fitting 156 is a short length of conduit 61 which, as noted hereinabove, has a cap 62 thereon removable for off-loading of the vehicle supply tank 19, if desired, by operating pumps P,P' even though the vehicle is not in motion, as is possible when utilizing a transfer case drive arrangement for the variable displacement pump.

Extending forwardly of the vehicle from fitting 156 is sparge line 53 of similarly large diameter tubing with valve 54 being shown in said sparge line 53 adjacent the rear face of tank compartment 108 of the tank 19. Said valve 54 may be of a quarter-turn ball type, being normally open to permit treatment liquid to be returned via lines 23,23' from diverter valve 50,50', in the event either of them is in the diverting position preventing treatment fluid from being delivered to the respective boom B,B', but when closed permitting such off-loading through conduit 61. An extension or portion 56 of sparge line 53 extends forwardly from valve 54 into tank compartment 107,108 for return of diverted treatment fluid to the tank.

The sparge arrangement is such as to provide for agitation of the contents of the tank, as noted. For this purpose, the orifices or openings 57 of the sparge extension line 56 are preferably oriented downward and said sparge line 56 is located off center with respect to the tank, i.e., enters the tank to one side of the longitudinal center-line of the symmetrically configured tank, being parallel.

Figures 8, 9:
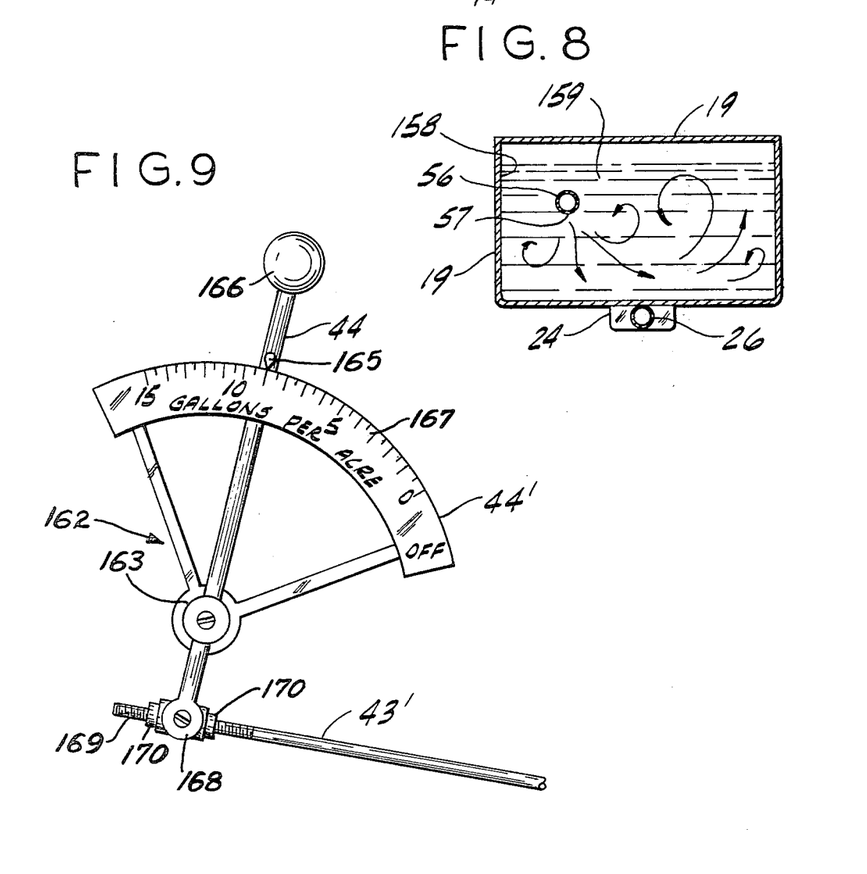
FIG. 8 is a simplified vertical cross section of a treatment liquid supply tank of the system.
FIG. 9 is a side elevation of a control arm and quadrant for operator control of the spraying system from the cab of the truck.

Referring to FIG. 8, a simplified cross section of the tank illustrates the placement and orientation of sparge extension line 56 into tank 19 with a representative opening 57 in line 56 permitting treatment liquid returned via conduit 56 to be directed into the interior 158 of the tank which is shown to contain a quantity 159 of treatment liquid. The placement of sparge conduit 56 to provide an off-center relationship in the tank, as well as the downward orientation of the apertures 57 therein, provide for a circulating movement as well as swirling and stirring of fluid within the tank, as depicted by arrows. Such swirling or stirring agitation is of benefit in causing mixing of the contents of the tank and in presenting the settling of particular matter which is in some treatment liquids.

During normal usage, it is ordinarily sufficient to provide agitation of the contents 159 of the tank by the ordinary return of fluid pumped by pumps P,P' and redirected through the tank by diverter valves 50,50' when in their diverting position, i.e., when no treatment liquid is being supplied to the booms. However, if desired, an auxiliary pump may be employed, such pump being preferably of centrifugal nature and interconnecting conduit liquid supply line 26 with sparge line 53 for causing a predetermined amount of recirculation of fluid to occur if desired.

Referring to FIG. 2, the preferred arrangement of a control apparatus 162 for precisely determining the volumetric output rate of variable displacement pump 34 as a function of the ground travel speed of vehicle 10 is illustrated. As previously noted, the output of variable displacement pump 34 is controlled by a lever 43 (FIG. 1) having connected thereto a linkage or rod 43' which preferably extends to the cab 16 of the vehicle, wherein there is conveniently mounted quadrant 44' which includes a suitable bearing 163 with respect to which a control level 44 is pivotally mounted. Said lever 44 has a marker 165 adjacent the upper end below a handle 166 which precisely indicates the position of the lever with respect to indicia 167 which are presented on the face of quadrant 44'. For calibration purposes, the relative position of marker 165 may be relocated by adjustment of control lever 44 with respect to link 43' by means of a pivotal connection 168 which may be adjusted relative to the end 169 of link 43' as by means of lock nuts 170. The indicia, for example, may represent a precisely calibrated spraying rate which will be produced in response to a given output rate of variable displacement pump 34. Representatively, the indicia may be in gallons or pounds per acre (or per units of time), or the like, so that the operator may preselect a desired spraying application rate with the assurance that the precise amount indicated at the position of indicator 165 on quadrant 44' will actually be applied to an agricultural area to undergo spraying.

Preferably also, cab 16 of the vehicle includes electrical switches or valves for controlling operation of hydraulic cylinders (such as those indicated at 84,84') to cause booms B,B' to be extended or retracted, or elevated as desired so that the operator has ready control for disposing the associated spray booms B,B' in desired position, all as disclosed in above-identified Jackson U.S. Pat. No. 3,902,667 and application Ser. No. 776,948.

Referring to FIG. 1, it may be noted that a switch 171 is interconnected between solenoid valves winding 45a,45b and the voltage source therefor so that solenoid valve 42 will be operative to deliver hydraulic fluid from supply conduit 41 to hydraulic motor 30 only when switch 168 is closed, it being understood that when operative, solenoid valve 42 simply permits hydraulic fluid to be returned from conduit 41 via conduit 47 to the hydraulic oil supply. Said switch 168 is preferably located also in the vehicle cab 16 so that the operator may readily control the turning on or off of the spraying operation through the simple expedient of closing or opening the single switch 168, as desired. Counters 70a,70b may also be located, if desired, in the cab, since their connection with the system is entirely electrical, so that relocation is a simple matter of routing electrical leads of appropriate length.

In operation, the new spraying system is found to achieve certain remarkable results and to provide numerous unique advantages. Not only is the system amenable to the spraying of various types of agricultural liquids, but it is capable of supplying any of such liquids by spray booms at a precisely determined application rate which is simply and easily controlled with the assurance that such rate of application is correct and accurate. Thus, to a degree hitherto unobtainable, a spraying system of the invention attains an accuracy and precision of application which exceed the stringent restrictions which not only are commercially and practically desirable but may be legally imposed upon the application of agricultural treatment liquids by spraying.

Moreover, the new system achieves such advantages in an extraordinarily efficient manner. Because of the use in the system of hydraulic linear motor 30 which provides pumping by pumps P,P' of precisely metered amounts of liquid at a metering rate (i.e., the motor 30 stroke rate) which varies with the output of variable displacement pump 34 as a proportional function of the ground travel speed of the vehicle, there is negligible wasting of energy in translating the flow of hydraulic fluid under pressure from variable displacement pump 34 into the direct pumping by pumps P,P' of agricultural treatment liquid from supply tank 19. This synergistic new system thus sharply contrasts with systems used for many years in the prior art and still utilizing high volume centrifugal pumps which necessarily circulate large volumes of treatment liquid (regardless of desired application rate) due to their high rotational velocities with consequent loss of energy and wear of parts not only through friction but also due to the abrasion of various fluid handling components which results from the high volumetric flow through such components of treatment liquids having granular or particulate materials suspended therein.

But a similarly important further advantage of the new system is its ease of construction, assembly, and maintenance made possible by the use of easily connected hydraulic or electro-hydraulic components and relatively few mechanical elements, all of which permits even relatively unskilled manufacturing or maintenance personnel to assemble and maintain the system. Such characteristic design thereby conduces to economy of construction and durability and reliability in operation. The characteristic nature of the components utilized and their relationship provide a system which is stable and resistant to breakdown in operation.

Although the foregoing includes a description of the best mode contemplated for carrying out the invention, various modifications are contemplated.

As various modifications could be made in constructions herein described and illustrated without departing from the scope of the invention, it is intended that all matter contained in the foregoing description or shown in the accompanying drawings shall be interpreted as illustrative rather than limiting.

What is claimed is:

1. For use with a vehicle having at least one spray boom and a source of supply of liquid to be dispensed by said boom, a spraying system comprising a hydraulic pump powered by said vehicle for providing hydraulic fluid at rate corresponding to ground travel speed of said vehicle, a reciprocating-stroke linear hydraulic motor adapted for being operated by said hydraulic fluid, a reciprocating-stroke linear pump of double acting configuration, said hydraulic motor and said reciprocating-stroke pump each having a cylinder and a piston reciprocal in said cylinder, means interconnecting each piston for reciprocal actuation of the piston of said reciprocating-stroke pump in response to reciprocation of the piston of said hydraulic motor, means for alternately supplying hydraulic fluid from said hydraulic pump to the opposite ends of the cylinder of said hydraulic motor for causing reciprocation of the piston of said hydraulic motor, said reciprocating-stroke pump having a suction inlet for receiving said liquid from said source and an outlet for delivering a precisely metered amount of said liquid upon each stroke of reciprocating-stroke pump, and means for interconnecting said reciprocating-stroke pump outlet with said boom, whereby precisely metered amounts of said liquid are dispensed by said boom upon each stroke of said reciprocating-stroke pump as a function of the ground travel speed of said vehicle.

2. For use with a vehicle, a spraying system as defined in claim 1, said means for interconnecting said pump outlet with said boom comprising a diverter valve, conduit means interconnecting said pump outlet with said diverter valve, boom supply conduit means interconnecting said boom with said diverter valve, and return conduit means interconnecting said liquid supply source with said diverter valve, said diverter valve being selectively operable between a boom supply position providing said liquid to said boom and liquid return position returning said liquid to said supply source.

3. For use with a vehicle, a spraying system as defined in claim 2, said liquid source comprising a tank, said return conduit means comprising a sparge line extending into said tank, said sparge line having discharge orifice means positioned for return of said liquid to the interior of said tank in a manner to cause agitation of liquid in said tank, said sparge line being presented within said tank in a position of off-center relationship with respect to said tank, said orifice means comprising a plurality of openings in said sparge line, said openings being directed toward the bottom of said tank.

4. For use with a vehicle, a spraying system as defined in claim 1, said hydraulic pump being controllable to provide a selectively variable predetermined rate of hydraulic fluid output whereby selectively variable metered amounts of said liquid are dispensed by said boom as a function of the ground travel speed of said vehicle.

5. For use with a vehicle, a spraying system as defined in claim 1, said vehicle having first and second booms, said reciprocating-stroke pump being adapted to be interconnected only with said first boom, a second reciprocating-stroke pump having a cylinder, a piston reciprocal therein, means interconnecting the last-said piston with the piston of said hydraulic motor for reciprocation in response to reciprocation of the piston of said hydraulic motor, a suction inlet for receiving said liquid from said source and an outlet for delivering a precisely metered amount of said liquid upon each stroke of said second pump, and means for interconnecting said second pump outlet only with said second boom, whereby precisely metered amounts of said liquid are dispensed independently by each of said booms as a function of the ground travel speed of said vehicles.

6. For use with a vehicle, a spraying system as defined in claim 1 or 5, said spraying system further comprising counter means for selectively counting and indicating in response to pump strokes to provide an accurate total of the metered amounts of boom-dispensed liquid, said counter means being adapted for counting operation only upon liquid being dispensed.

7. For use with a vehicle, a spraying system as defined in claim 1, said hydraulic motor cylinder having hydraulic fluid ports respectively communicating with the opposite ends thereof, said means for alternately supplying hydraulic fluid to the opposite ends of said hydraulic motor cylinder comprising at least one solenoid valve, hydraulic conduit means interconnecting said ports and further hydraulic conduit means interconnecting said solenoid valve and said hydraulic pump, said solenoid valve being selectively electrically energizable in operation to alternately connect said further conduit means via the first-said conduit means to opposite ones of said ports, and switch means responsive to said reciprocating strokes for selectively controlling the electrical energization to cause said operation of said solenoid.

8. For use with a vehicle, a spraying system as defined in claim 7, said solenoid valve having a pair of operating windings, said switch means comprising switching devices proximate each end of said hydraulic motor cylinder and each responsive to an end-of-stroke position of said hydraulic motor piston within said cylinder.

9. For use with a vehicle, a spraying system as defined in claim 8, said system further comprising electrically energizable counter means interconnected with said switching devices for being energized to increment said counter means in response to each stroke of said hydraulic motor, whereby the count of said counter means is representative of the precisely metered amounts of liquid delivered by said reciprocating-stroke pumps.

10. For use with a vehicle, a spraying system as defined in claim 1, said system further comprising a surge eliminating chamber communicating with said means for interconnecting said pump outlet with said boom.

11. For use with a vehicle, a spraying system as defined in claim 1, said hydraulic motor causing said reciprocating-stroke pump to deliver said precisely metered amounts of liquid at a metering rate constituting the stroking rate of the last-said pump and which varies as a proportional function of the ground travel speed of said vehicle.

12. For use with a vehicle, a spraying system as defined in claim 11, said proportional function being determined by the rate of output of hydraulic fluid by said hydraulic pump.

13. For use with a vehicle, a spraying system as defined in claim 12, said hydraulic pump being a piston-type pump and being controllable to provide a selectively variable predetermined rate of output of hydraulic fluid as ratio of ground travel speed of said vehicle.

14. For use with a vehicle having first and second spray booms and a source of supply of liquid to be dispensed by said spray booms, a spraying system comprising a hydraulic pump powered by said vehicle for providing hydraulic fluid at a rate corresponding to ground travel speed of said vehicle, a reciprocating stroke, linear hydraulic motor adapted for being operated by said hydraulic fluid, and first and second reciprocating-stroke linear pumping means, said hydraulic motor and said first and second reciprocating-stroke pumping means each of double acting configuration and having a cylinder and a piston linearly reciprocal therein, means interconnecting all of said pistons for reciprocal stroking actuation of the piston of said first and second pumping means in response to reciprocation of the piston of said hydraulic motor, means for alternately supplying hydraulic fluid from said hydraulic pump to the opposite ends of the cylinder of said hydraulic motor for causing reciprocation of the piston of said hydraulic motor, said first and second pumping means having at least one suction inlet for receiving said liquid and a pair of outlets each associated uniquely with a respective one of said pumping means and each adapted for delivering a precisely metered amount of said liquid upon each stroke of the respective pumping means, first and second diverter valves, first and second fluid conduit means interconnecting the respective outlets with one of said diverter valves, first and second boom supply conduit means interconnecting the respective one of said booms with a corresponding one of said diverting valves, return conduit means interconnecting said liquid supply source with each of said diverter valves, each said diverter valve being selectively operable between a boom supply position providing said liquid to a corresponding one of said booms and a liquid return position returning said liquid to said supply source, whereby precisely metered amount of said liquids are dispensed independently by each of said booms upon each stroke of the respective pumping means as a function of the ground travel speed of said vehicle.

15. For use with a vehicle, a spraying system as defined in claim 14, said liquid source comprising a tank, said return conduit means comprising a sparge line extending into said tank, said sparge line having discharge orifice means positioned for return of said liquid from either of said diverter valves to the interior of said tank in a manner to cause agitation of said liquid in said tank.

16. For use with a vehicle, a spraying system as defined in claim 15, said sparge line being presented within said tank within a position of off-center relationship with respect to said tank, said orifice means comprising a plurality of openings in said sparge line directed toward the bottom of said tank.

17. For use with a vehicle, a spraying system as defined in claim 14, said spraying system further comprising counter means for selectively counting and indicating the stroking of said first and second pumping means to provide an accurate total of the metered amounts of boom-dispensed liquid.

18. For use with a vehicle, a spraying system as defined in claim 14, said counter means comprising first and second counters each adapted for counting stroking of a corresponding one of said first and second pumping means.

19. For use with a vehicle, a spraying system as defined in claim 18, said first and second counters each being valve-controlled for counting stroking of a corresponding one of said first and second pumping means only upon liquid being dispensed by a corresponding one of said first and second spray booms by operation of said diverter valves, said diverter valves controlling also said counters.

20. For use with a vehicle, a spraying system as defined in claim 14, said means for alternately supplying hydraulic fluid to the opposite ends of the cylinder of said hydraulic motor comprising at least one solenoid valve, hydraulic conduit means interconnecting ports at said opposite cylinder ends with said solenoid valve, further hydraulic conduit means interconnecting said solenoid valve and said hydraulic pump, said solenoid valve being selectively electrically energizable in operation to alternately connect said further conduit means via the first-said conduit means to opposite ones of said ports, and switch means responsive to said reciprocating strokes for selectively controlling the electrical energization to cause said operation of said solenoid.

21. For use with a vehicle, a spraying system as defined in claim 20, said solenoid valve having a pair of operating windings, said switch means comprising switching means proximate each end of said hydraulic motor cylinder and each responsive to end-of-stroke position of said hydraulic motor piston within said cylinder.

22. For use with a vehicle, a spraying system as defined in claim 21, said system further comprising electrically energizable counter means interconnected with said switching means for being energized to increment said counter means in response to stroking of said hydraulic motor, whereby the count of said counter means is representative of the precisely metered amounts of liquid delivered by said first and second pumping means.

23. For use with a vehicle, a spraying system as defined in claim 14, said system further comprising first and second surge eliminating chambers communicating with said first and second boom supply conduit means, respectively.

24. For use with a vehicle, a spraying system as defined in claim 14, said hydraulic pump being controllable to provide a selectively variable predetermined rate of hydraulic fluid output whereby selectively variable metered amounts of said liquid are dispensed by said booms as a function of the ground travel speed of said vehicle.

25. For use with a vehicle, a spraying system as defined in claim 14, said hydraulic motor causing said reciprocating-stroke pumping means to deliver said precisely metered amounts of liquid at a metering rate constituting the stroking rate of said first and second pumping means and which varies as a proportional function of the ground travel speed of said vehicle.

26. For use with a vehicle, a spraying system as defined in claim 25, said proportional function being determined by the rate of output of hydraulic fluid by said hydraulic pump.

27. For use with a vehicle, a spraying system as defined in claim 26, said hydraulic pump being a piston-type pump and being controllable from a remote location to provide a selectively variable predetermined rate of output of hydraulic fluid as a ratio of ground level speed of said vehicle.

28. For use with a vehicle, a spraying system as defined in claim 14, each of said first and second pumping means comprising a separate pump housing, said housings being spaced apart, said hydraulic motor comprising a pump housing positioned between said pump housings, and each of said first and second pumping means and hydraulic motor actuators having reciprocating-stroke movement in unison.

29. For use with a vehicle, a spraying system as defined in claim 28, said pump housings being spaced apart in parallel relationship, said hydraulic motor housing being positioned in alignment with said pump housings there between, and said means interconnecting all of said pistons comprising actuator rods interconnected with the respective piston and a link bar interconnecting all of said actuator rods.

30. For use with a vehicle, a spraying system as defined in claim 29, said spraying system further comprising guide means for guiding said link during reciprocating strokes back and forth of actuator rods of said pumping means and hydraulic motor for preventing excessive lateral stress from being applied to the respective actuator rods.

31. For use with a vehicle, a spraying system as defined in claim 14, said vehicle including a transverse case, said hydraulic pump being driven from said transfer case.

* * * * *

UNITED STATES PATENT OFFICE
CERTIFICATE OF CORRECTION

Patent No. 4,260,107          Dated April 7, 1981

Inventor(s) Clarence L. Jackson

It is certified that error appears in the above-identified patent and that said Letters Patent are hereby corrected as shown below:

Column 18, Claim 31, line 51, change "transverse" to
---transfer---.

Signed and Sealed this

Eighteenth Day of August 1981

[SEAL]

*Attest:*

*Attesting Officer*       GERALD J. MOSSINGHOFF

Commissioner of Patents and Trademarks